(12) United States Patent
Campbell et al.

(10) Patent No.: US 6,810,739 B1
(45) Date of Patent: Nov. 2, 2004

(54) ACCELEROMETER AUGMENTED LEVELING DEVICE

(75) Inventors: Ray F. Campbell, Newport Beach, CA (US); Thomas J. Gunther, Pasadena, CA (US); Joan D. Wada, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/604,563

(22) Filed: Jul. 30, 2003

(51) Int. Cl.[7] .............................................. G01P 15/00
(52) U.S. Cl. ................................................... 73/514.01
(58) Field of Search ...................... 73/510, 511, 514.32, 73/504.02, 514.01; 700/19, 20, 56, 61

(56) References Cited

U.S. PATENT DOCUMENTS 6,128,955 A  * 10/2000 Mimura ........................ 73/510
6,609,037 B1 *  8/2003 Bless et al. ................... 700/45
6,701,788 B2 *  3/2004 Babala ......................... 73/649

* cited by examiner

*Primary Examiner*—Helen Kwok
(74) *Attorney, Agent, or Firm*—Artz & Artz, PC (57) ABSTRACT

A leveling system for a missile system includes a platform defining an xz-plane and a yz-plane. A first dual bridge sensor is coupled to the platform at an angle such that the first dual bridge sensor is sensitive to movement of the first dual bridge sensor in the xy-plane. The first dual bridge sensor includes a first flexure plate generating a first dual bridge sensor signal in response to movement of the first flexure plate. A second dual bridge sensor is coupled to the platform at an angle such that the second dual bridge sensor is sensitive to movement of the second dual bridge sensor in the xy-plane. The second dual bridge sensor includes a second flexure plate generating a second dual bridge sensor signal in response to movement of the second flexure plate. Third and fourth dual bridge sensors are arranged similarly to the first and second dual bridge sensors but with respect to the yz-plane. A processor drives the sensors with a precision sine wave and rotates the platform in response to the sensor signals.

21 Claims, 6 Drawing Sheets

Z-plane is shown vertically into paper

ACCELEROMETER AUGMENTED LEVELING DEVICE

BACKGROUND OF INVENTION

The present invention relates generally to leveling devices, and more particularly, to an accelerometer augmented leveling device.

It is well known that aerospace systems, such as missile systems, require internal control systems for the purpose of maintaining a particular level or attitude with respect to a fixed frame, such as the earth.

Currently, spirit levels or bubble level devices are used in conjunction with missile navigation systems to maintain a particular attitude of an object prior to launch or during flight thereof.

Typical spirit levels include a closed glass tube (vial) having a circular cross section and a center line also defining a circular arc. The internal surface thereof is filled with ether or low viscosity liquid with enough free space remaining for the formation of a bubble of air and other gasses.

Spirit levels are, however, subject to condensation and fluid breakdown over time, resulting in loss of efficiency and accuracy.

As was mentioned, this type of leveling device is used in aerospace or in a portion of aircraft or spacecraft navigation or guidance systems. During operation of those system types, the temperature in the operating environment of the spirit level changes over a wide range. Consequently, leveling must be measured and controlled with a high accuracy over a wide range of temperatures and temperature gradients. This is often a difficult and inefficient process.

The disadvantages associated with current leveling systems have made it apparent that a new leveling system is needed. The new leveling system should eliminate fluid breakdown, substantially minimize temperature sensing requirements, and should also improve leveling detection accuracy. The present invention is directed to these ends.

SUMMARY OF INVENTION

In accordance with one aspect of the present invention, a leveling device includes a platform defining an xz-plane. A first dual bridge sensor is coupled to the platform at an angle such that the first dual bridge sensor is sensitive to movement of the first dual bridge sensor in an xy-plane. The first dual bridge sensor comprises a first flexure plate generating a first dual bridge sensor signal in response to movement of the first flexure plate. A second dual bridge sensor is coupled to the platform at an angle such that the second dual bridge sensor is sensitive to movement of the second dual bridge sensor in the xy-plane. The second dual bridge sensor comprises a second flexure plate generating a second dual bridge sensor signal in response to movement of the second flexure plate. A processor drives the first dual bridge sensor and the second dual bridge sensor with a precision sine wave.

In accordance with another aspect of the present invention, a method for operating a leveling system includes driving a first flexure plate dual bridge sensor with a first precision sine wave and generating a first dual bridge sensor signal from the first flexure plate dual bridge sensor. The method further includes driving a second flexure plate dual bridge sensor with a second precision sine wave and generating a second dual bridge sensor signal from the second flexure plate dual bridge sensor. A platform rotates clockwise when the first dual bridge sensor signal is greater than the second dual bridge sensor signal. The platform rotates counter-clockwise when the second dual bridge sensor signal is greater than the first dual bridge sensor signal. The method still further includes driving a third flexure plate dual bridge sensor with a third precision sine wave and generating a third dual bridge sensor signal from the third flexure plate dual bridge sensor. The method further includes driving a fourth flexure plate dual bridge sensor with a fourth precision sine wave and generating a fourth dual bridge sensor signal from the fourth flexure plate dual bridge sensor. The platform rotates clockwise when the third dual bridge sensor signal is greater than the fourth dual bridge sensor signal and rotated counter-clockwise when the fourth dual bridge sensor signal is greater than the third dual bridge sensor signal.

One advantage of the present invention is that it generates a dynamic range and granularity sufficient for InterContinental Ballistic Missile (ICBM) usage. Additional advantages include that the leveling device consumes less power than prior leveling devices, while dramatically improving reliability and reduction in manufacturing costs.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

The present invention is illustrated with respect to an aeronautical system, including an accelerometer augmented leveling device (AALD), particularly suited to the aeronautical field. The present invention is, however, applicable to various other uses that may require leveling devices, such as any system requiring initialization or stabilization measurements both at start-up and in operation under extreme conditions, as will be understood by one skilled in the art.

Figure 1:
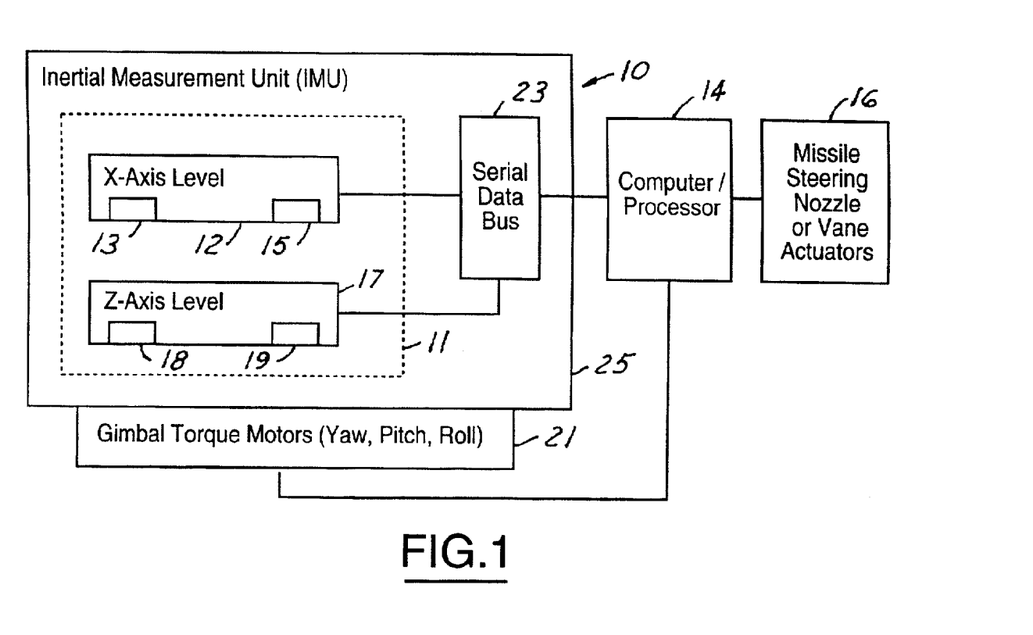
FIG. 1 illustrates an aeronautical system including a leveling device in accordance with one embodiment of the present invention.

Referring to FIG. 1, the aeronautical system 10 (here illustrated as a Minuteman III missile system), including a leveling device 11 having two levels 12 and 17, is illustrated. The aeronautical system 10 is merely an illustrative example of an object requiring leveling and is not meant to be limiting. For example, the present levels 12 and 17 could be implemented in any accelerating object to sense leveling forces, including any type of vehicles.

The levels 12, 17 of the leveling device 11 are included within an inertial measurement unit 25 (IMU). Within the leveling device 11, the x-axis level 12 and z-axis level 17 are coupled to a platform, here embodied as gimbals and gimbal torque motors 21 (yaw, pitch or roll motors). The levels 12 and 17 are also coupled to a serial bus 23, which transfers information to a computer/processor 14. The processor 14 is also coupled to the missile steering nozzle (or vane actuators) unit 16 and the gimbal torque motors 21.

Figure 2:
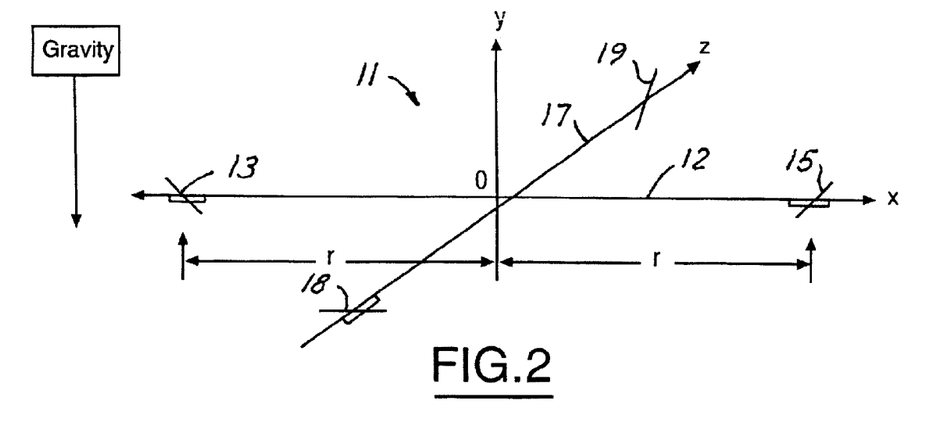
FIG. 2 illustrates a perspective view of a leveling system in accordance with FIG. 1.
Figure 3:
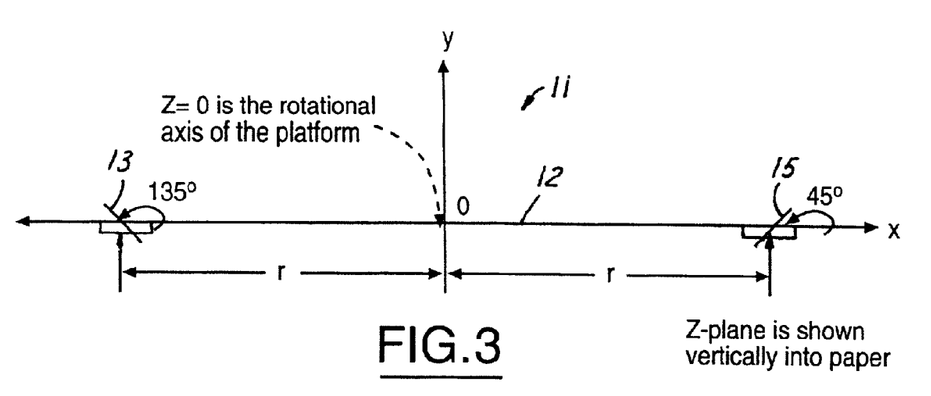
FIG. 3 illustrates an xy axis side view of the leveling system of FIG. 2.
Figure 4:
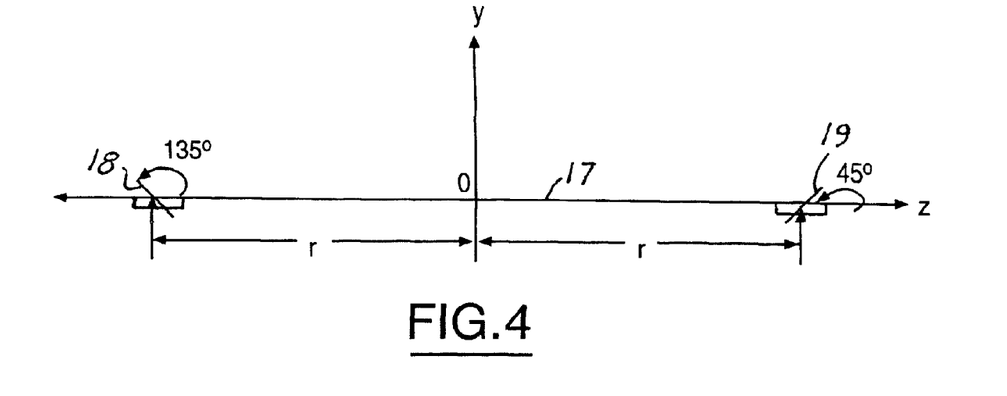
FIG. 4 illustrates a yz axis side view of the leveling system of FIG. 2.

Referring to FIGS. 2, 3 and 4, a simplified implementation diagram of the acceleration augmented leveling device 11, in accordance with one embodiment of the present invention, is illustrated.

The accelerometer augmented leveling device 11 is embodied as a four accelerometer device that provides a precise measurement of the orientation of a plane with respect to the earth. The leveling device 11 includes four flexure plate accelerometers 13 (first), 15 (second), 18 (third), 19 (fourth), each of which may be configured as illustrated in either FIG. 5. Each accelerometer 13, 15, 18, 19 is embodied as a single axis accelerometer that can provide a reliable wide dynamic range of performance.

Figure 5:
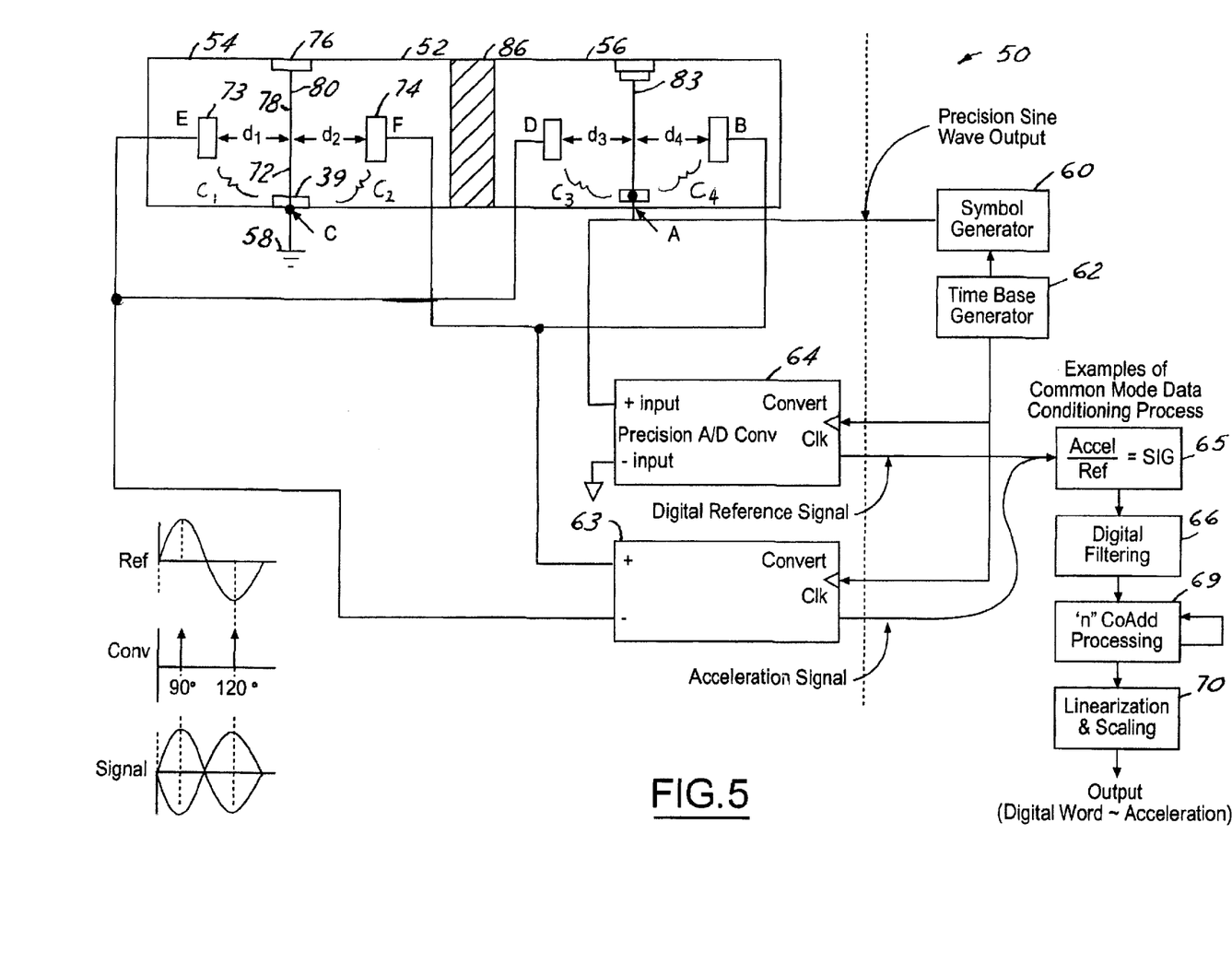
FIG. 5 illustrates a bridge accelerometer system in accordance with FIG. 1.

Four accelerometers as in FIG. 5, configured per FIG. 2 are included to implement the leveling device 11. The accelerometers 13 and 15 have centers which are located on the x-axis on the xz plane. One embodiment of a possible accelerometer mounting configuration includes accelerometer 13 having a mounting angle of 135 degrees with respect to the x-axis, indicating it has a sensitive axis at 45 degrees with respect to the x-axis and no z component. According to this embodiment, accelerometer 15 is similarly mounted at 45 degrees with respect to the x-axis, resulting in a sensitive axis of 135 degrees. The center of each accelerometer is located at a distance r from the origin O. Important to note is that the mounting angles and the distances from the origin included herein are merely illustrative examples of an efficient possible arrangement of the accelerometers 13, 15, 18, 19. Alternate embodiments include the accelerometers 13, 15, 18, 19 at varying known distances that may or may not be identical and varying known mounting angles, which also may or may not be identical.

Accelerometers 18 and 19 have centers located on the z-axis on the xz plane. Accelerometer 18 has a mounting angle of 135 degrees with respect to the z-axis, indicating its sensitive axis is at 45 degrees with respect to the z-axis, and has no x component. Accelerometer 19 is similarly mounted at 45 degrees with respect to the z-axis, making the sensitive axis 135 degrees. The center of each device is located at a distance r from the origin.

The centers of all accelerometers 13, 15, 18, 19 are located in, for example, the xz-plane. The xz-plane is the surface which will be leveled and is assumed to be a uniformly flat structure. Although this may not be always true in practice, the deviations may be calibrated during manufacture.

In the present invention, the accelerometers 13, 15, 18, 19 are equidistant from the central y-axis. This is only one possible arrangement, and, in fact, they may be both on either side of the origin, on the conditions they are separated by a known distance and at a known distance from the origin.

The xz surface has controls, such as missile steering 16, which allow rotation about the x-axis or z-axis. The leveling device 11 will also be rotated about the y-axis in order to establish the direction of earth rotation so that these effects may be measured and calibrated out.

Initially, the level device 11 will monitor the angle of each accelerometer 13, 15, 18, 19, and the result will drive the controls of each axis to result in an equal output of each pair of accelerometers 13 and 15, 18 and 19. When they are all equal, they all measure earth's gravity at a 45 degree angle or an angle whose sine equals 45 degrees (135 degrees). Any deviation causes errors in the opposite polarity, this results in unique null conditions for the control loop.

Referring to FIG. 5, a bridge accelerometer 50 in accordance with another example of a possible flexure plate accelerometer design from FIGS. 1, 2 and 3 is illustrated. Each bridge accelerometer 50 or differential bridge sensor is an example of one or all of the four accelerometers 13, 15, 18, and 19 and is a single axis accelerometer that generates a robust wide dynamic range of performance. Important to note is that alternate embodiments of the present invention have one or more accelerometers, the illustrated accelerometers 13, 15, 18, and 19 are only one example of a possible arrangement of accelerometers, and any number of accelerometers can be utilized. Furthermore, a combination of different flexure plate accelerometer designs may also be utilized in accordance with the designs included in FIG. 5 or any alternate flexure plate design known in the art.

As was mentioned, the accelerometer 50 will be described as an illustrative example of the four bridge accelerometers 13, 15, 18, and 19 in this embodiment. The accelerometer 50 is part of the inertial measurement unit 25 and includes a housing 52, a flexured plate section 54, a rigid plate section 56, a ground 58, an AC source or a symbol generator 60, a time base generator 62, a pair of analog-to-digital converters 63, 64, a digital filter 66, a phase relation device 65, a co-adder 69 and a digital linearizer and filter 70.

The housing 52 or metal housing structure encloses four capacitors, which will be discussed later. A gas or vacuum environment is also enclosed therein such that there is no interference with the movement of the flexure plate 72 other than the acceleration of the system 10 along a perpendicular axis.

The flexured plate section 54 includes a single flexure plate 72 and two parallel fixed plates 73, 74. The rigid plate section 56 includes a rigid plate and two fixed plates. The two sections are electrically isolated and enclosed in a metal-housing structure 52.

In the present embodiment, the flexure plate 72 is coupled to the housing 52 at only one edge 76. Numerous other attachment points are, however, included, as will be understood by one skilled in the art. The flexure plate 72 includes a first side 78, a second side 80 and a common edge 76.

The flexure plate 72 is positioned between the first and second fixed plates 73, 74 such that the first fixed plate 73 is a first distance ($d_1$) from the first side 78 and the second fixed plate 74 is a second distance (d 2) from the second side 33 of the flexure plate 72. The flexure plate 72 is affixed to the metal housing structure 52 through at least a portion of the common edge 76 of the flexure plate 72, which is also coupled to a ground 58.

The flexure plate is rigidly fixed to the metal housing structure 52 through almost any manner known in the art. Resultantly, all the system flexure is generated within the flexure plate 72. This generally increases reliability and robustness of the system 10. This, however, generates a non-linear output from the flexure plate 72, which will be discussed regarding the linearizer 70.

The combination of the first fixed plate 73 and the flexure plate 72 forms a first parallel plate capacitor, and the combination of the second fixed plate 74 and the flexure plate 72 forms the second parallel plate capacitor.

The capacitance of the parallel plate capacitors is determined by the following:

$$C \cong (\epsilon_r A)/d,$$

where $\epsilon_0$ is the permittivity constant, A is the area of a fixed plate, and d is the effective distance between the flexure plate 72 and one of the fixed plates 73, 74.

The first fixed plate 73 is coupled to the metal housing structure 52 and positioned a first distance ($d_1$) from the flexure plate 72. The first fixed plate 73 and the flexure plate 72 form a first capacitor whose operation is also governed by the equation $$C \cong (\epsilon_0 A)/d.$$

The first fixed plate 73 responds to movement of the flexure plate 72 when $d_1$ either increases or decreases, thereby generating a first phase shift capacitance signal.

The second fixed plate 74 is also coupled to the metal housing structure 52 and positioned a second distance ($d_2$) from the flexure plate 72. The second fixed plate 74 and the flexure plate 72 form a second capacitor whose operation is governed by the equation $$C \cong (\epsilon_0 A)/d.$$

The second fixed plate 74 responds to movement of the flexure plate 72 when $d_2$ either increases or decreases, thereby generating a second phase shift capacitance signal.

The distances ($d_1$ and $d_2$) between the flexure plate 72 and the fixed plates 73, 74 are a function of acceleration and are proportional or equal when the system 10 is at rest.

During acceleration, the flexure plate 72 flexes according to the reaction force of Newton's second law of motion, force=mass×acceleration (F=ma), causing the distance between the flexure plate 72 and the fixed plates 73, 74 to vary, thus creating the two variable capacitors, one on each side of the flexure plate 72.

A rigid plate section 56 is insulated by an insulator 86 from the flexure plate section 54. Third and fourth capacitors are formed on either side of the rigid plate 83 in a similar arrangement as the first and second capacitors.

The first and second capacitors are formed on each side of the flexure plate 72 and the third and fourth capacitors are formed on either side of the rigid plate 83. The four capacitors are electrically connected to form a bridge. The fixed capacitors (third and fourth) and rigid plate 83 are isolated from the flexure plate 72 and flexured plate capacitors (first and second). All capacitors are designed to be as nearly equal as possible when at rest.

The distance between the flexure plate 72 and the rigid plate 83 is a function of acceleration. The center of each bridge side is monitored to detect the differential amplitude. As the flexure plate 72 flexes in response to acceleration, one capacitor increases and the other decreases, thereby increasing the bridge voltage on one side and decreasing bridge voltage on the other.

The bridge is excited with the symbol generator 60 and the time base generator 62 at one end and grounded at the other. The ground 58 is coupled to the flexure plate 72 and the AC source 60 is coupled to the rigid plate 83. The two capacitive legs (C3, C1) and (C4, C2) of the bridge produce two voltage dividers, each of which provides a terminal (ED, FB), to measure the resulting voltage.

The bridge configuration reduces the temperature sensitivity and the AC excitation allowing narrow band digital filtering, both of which enhance the signal-to-noise ratio. The bridge circuitry utilizes GaAs or high speed CMOS, as the accuracy required for performance will require low propagation delays.

The voltage phase gives direct indication of the direction of acceleration. The bridge output reference and signal is A/D converted 63, 64 and transmitted to the software domain, where the signal is divided by the reference 65. The digital filter 66 reduces the overall noise and provides output to a co-adder 69, which further enhances the signal to noise process prior to linearization and scaling 70.

The converters 63, 64 may be a single converter or a pair of synchronized dual stereo sigma delta converters making simultaneous conversions at the peaks of sine waves generated from the flexured plate section and the fixed plate section (for embodiments that include driving the accelerometers 13, 15, 18, 19 with a precision sine wave). Both the reference signal and the output signal are monitored by a differential input, high precision, stereo, sigma delta analog-to-digital converter (alternate style converters may be used, so long as they are synchronous in conversion and sufficient in accuracy). The conversions are generated at the peaks of the reference input (90 degrees, 270 degrees). Important to note is that the converters 63, 64 represent the first, second, third, and fourth set of synchronized delta converters. The frequency of the sine wave is typically set to half the maximum conversion frequency of A/D converters for maximum frequency, but alternate embodiments may be utilized to improve accuracy or noise parameters.

The results of the converters 63, 64 are translated through a hardware interface for software evaluation and received in a phase relation device 65, wherein the phase relation of the signal with respect to the reference generates an indication of the acceleration direction. Also within the phase relation device 65, the reference phase is then used to rectify or demodulate the peak signal conversions. The conversions are now absent the usual ripple and noise associated with analog processing as they are single point converted and possess the instantaneous signal and noise at the conversion time. The phase relation device 65 then divides the rectified signal by the reference amplitude to reduce common mode errors.

The digital filter 66 receives the rectified signal and filters it. Digital filtering reduces the input frequency to a frequency well above the flexure frequency of the flexure plate. This specific style of filtering may be determined by specific manufacturing constraints, but may be any order filter supportable by software. Traditional analog filtering such as n-pole Butterworth are included as software implementations.

The co-adder 69 receives the filtered signal. The data is therein co-added to reduce the data rate. The co-adding improves signal to noise by the square root of the number of co-adds.

The linearizer 70 receives the co-added signal. During the digital processing portion, additional linearization and scaling performed in the linearizer 70 so that the output digital word is a scaled linear result equal to acceleration along either direction of the perpendicular axis. In other words the co-added signal is filtered and linearized in the digital linearizer and filter 70 for manufacturing and flexure non-uniformities.

The filter is embodied, for example, as a multi-pole filter reducing noise to the required time domain level. The filter output is a digital word having a magnitude proportional to the acceleration of the system in either direction along the perpendicular axis. The output of the linearizer 70 is an acceleration signal multiplied by a constant (k).

Statistical filtering of the linearized data somewhere significantly above the maximum flexure frequency also occurs in either the digital linearizer and filter 70 or the computer 14 to reduce the overall noise impact on the system 10. The compensation for the non-linearity of the flexure structure and overall transport error is compensated for by the linearizer and filter 70 whose values are established in manufacturing through sampling performance curves.

Important to note is that for the present invention, the two accelerometers 13, 15 generate output signals F1 and F2 respectively, whereas accelerometers 18, 19 generate output signals F3 and F4 respectively.

The processor 14, in one embodiment of the present invention, includes the symbol generator 60, the time base generator 62, the phase relation device 65, the filter 66, the co-adder 69, and the linearizer 70.

The processor 14 receives the acceleration signal from the first converter 63 and the digital reference signal from the second converter 64 and generates a platform control signal and response thereto.

In one embodiment, the processor 14 drives the accelerometers 13, 15, 18, 19 with precision sine wave signals. The processor 14 is embodied as a typical missile or airplane processor, as is familiar in the art.

The processor 14 drives the bridge accelerometers 13, 15 with precision sine waves and synchronizes the dual stereo sigma delta converters 63, 64 to convert the signals simultaneously at the peaks of the sine waves from analog-to-digital.

The processor 14 accepts the output of each accelerometer pair through the converters 63, 64 and applies the compensation and calibration corrections derived from manufacturing and the earth rate calibration scheme. As the control loop drives the xz plane to null, the processor 14 monitors the system 10 so that all conditions are met, and the processor 14 also issues a level acquired indicator, for launch time or utilization time, and this position is locked as the reference plane.

The actuator, here embodied as missile steering nozzle or vane actuators 16 receives the processor signal and activates system components (e.g. object control devices) in response thereto. System components include for example, thrusters or attitude control devices.

Figure 6:
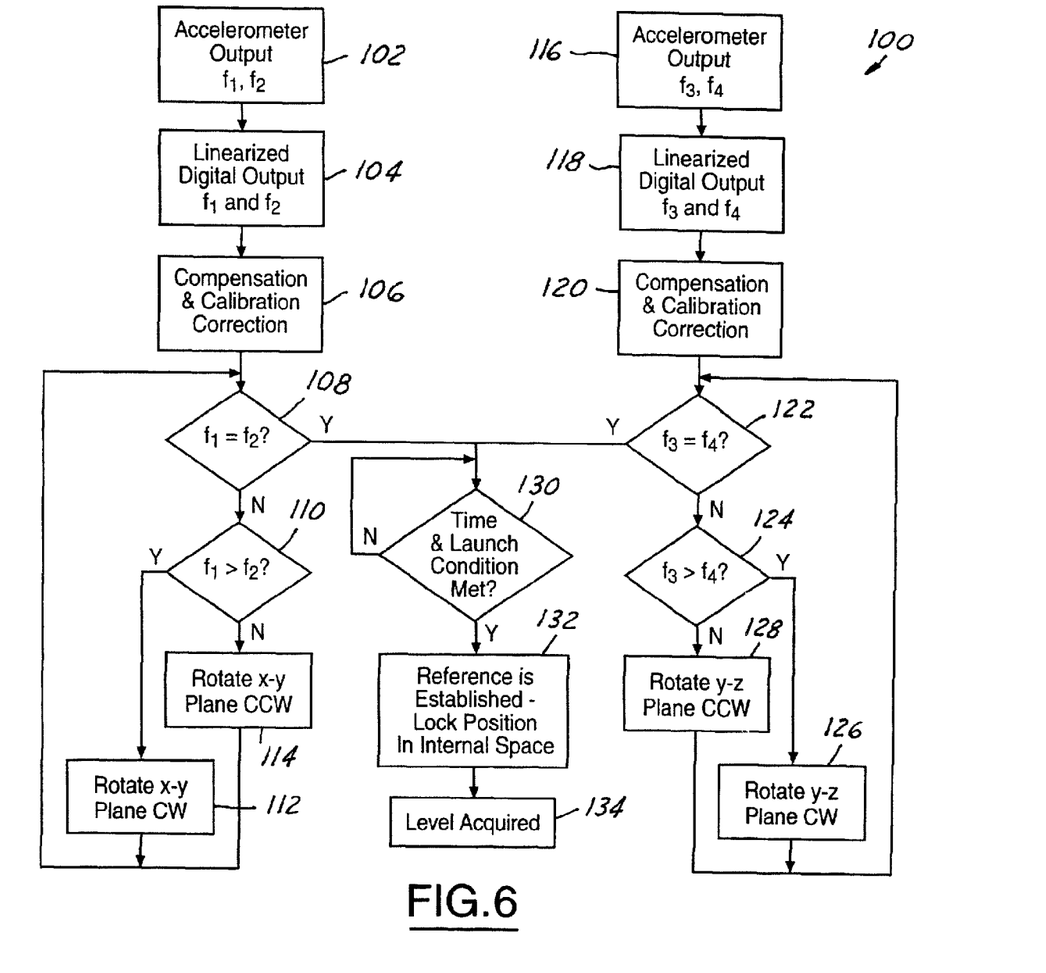
FIG. 6 illustrates a logic flow diagram of the aeronautical system of FIG. 1 in operation, in accordance with another embodiment of the present invention.

Referring to FIG. 6, a logic flow diagram 100 illustrating a method for leveling control is illustrated. The logic (which may be included in the computer 14) includes two control loops, one for the xy plane, and the other for the yz plane.

xy plane logic starts in operation block 102 where accelerometer outputs F1 and F2 are received in the processor 14. In operation block 104, the processor 14 linearizes the digital outputs F1 and F2. In operation block 106, the processor 14 compensates for signal noise and calibrates the signals using position and orientation data either obtained from other sensors or input by a technician.

In inquiry block 108, a check is made whether F1 equals F2. For a negative response, inquiry block 110 activates, and a check is made whether F1 is greater than F2. For a positive response, in operation block 112, the xy plane rotates clockwise in response to the thrusters, other missile actuators, or platform control devices. Otherwise, in operation block 114, the xy plane rotates counter-clockwise.

The yz plane logic starts in operation block 116 where accelerometer outputs F3 and F4 are received in the processor 14. In operation block 118, the processor 14 linearizes the digital outputs F3 and F4. In operation block 120, the processor 14 compensates for signal noise and calibrates the signals using position and orientation data either obtained from other sensors or input by a technician.

In inquiry block 122, a check is made whether F3 equals F4. For a negative response, inquiry block 124 activates, and a check is made whether F3 is greater than F4. For a positive response, in operation block 126, the yz plane (platform 21) rotates clockwise by the thrusters, platform control devices, or other missile actuators. Otherwise, in operation block 128, the yz plane (platform 21) rotates counter-clockwise.

For a positive response to both inquiry block 108 and inquiry block 122, in inquiry block 130, a check is made whether time and launch conditions are met. For a negative response, inquiry block 130 loops until time and launch conditions are met.

Otherwise, in operation block 132, a reference is established, and the position of the missile system 10 is locked in inertial space. In operation block 134, the leveling process is complete; the missile IMU platform 21 has acquired all leveling position information, and typically, the platform 21 will be level.

In operation, a method for operating a leveling system 10 includes driving a first flexure plate dual bridge sensor 13 with a first precision sine wave and generating a first dual bridge sensor signal from the first flexure plate dual bridge sensor 13. The method further includes driving a second flexure plate dual bridge sensor 15 with a second precision sine wave and generating a second dual bridge sensor signal from the second flexure plate dual bridge sensor 15.

The method still further includes driving a third flexure plate dual bridge sensor 18 with a third precision sine wave and generating a third dual bridge sensor signal from the third flexure plate dual bridge sensor 18. The method further includes driving a fourth flexure plate dual bridge sensor 19 with a fourth precision sine wave and generating a fourth dual bridge sensor signal from the fourth flexure plate dual bridge sensor 19. The frequencies of the sine waves are typically set to half the maximum conversion frequency of the converters 63, 64.

The processor 14 drives the bridge accelerometers 13, 15, 18, 19 with the precision sine waves and synchronizes the dual stereo sigma delta converters 63, 64 to convert the signals simultaneously at the peaks of the sine waves from analog-to-digital.

The division of the flexure signal by the reference rigid plate signal eliminates amplitude variations and rejects some common mode effects. This allows smooth transitions into the filtering software (filter 66). The accelerometers 13, 15, 18, 19 generate a low frequency signal, which is easily enhanced by implementing the multi-pole filter 66 to reduce the noise to the required level in a time domain.

The platform 21 and the leveling device 11 rotate clockwise when the first dual bridge sensor signal is greater than the second dual bridge sensor signal. The platform 21 and the leveling device 11 rotate counter-clockwise when the second dual bridge sensor signal is greater than the first dual bridge sensor signal.

The platform 21 and the leveling device 11 rotate clockwise when the third dual bridge sensor signal is greater than the fourth dual bridge sensor signal, and the platform 21 and the leveling device 11 rotate counter-clockwise when the fourth dual bridge sensor signal is greater than the third dual bridge sensor signal. In other words, the missile computer/processor 14 controls the pre-flight profile and flight profile through the missile nozzle, steering vane actuators, or other leveling controls.

This process is engaged when the missile is at rest, prior to launch. A calibration procedure within the processor 14 allows compensation for the offset introduced by the rotation of the earth.

From the foregoing, it can be seen that there has been brought to the art a new and improved accelerometer system 10. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

In the claims:

1. A leveling device comprising:
   a platform defining an xz-plane;
   a first dual bridge sensor coupled to said platform at an angle such that said first dual bridge sensor is sensitive to movement of said first dual bridge sensor in an xy-plane, said first dual bridge sensor comprising a first flexure plate generating a first dual bridge sensor signal in response to movement of said first flexure plate;
   a second dual bridge sensor coupled to said platform at an angle such that said second dual bridge sensor is sensitive to movement of said second dual bridge sensor in said xy-plane, said second dual bridge sensor comprising a second flexure plate generating a second dual bridge sensor signal in response to movement of said second flexure plate; and
   a processor driving said first dual bridge sensor and said second dual bridge sensor with a precision sine wave, said processor generating a platform control signal in response to said first dual bridge sensor signal and said second dual bridge sensor signal.

2. The system of claim 1, wherein said first dual bridge sensor and said second dual bridge sensor are equidistant from or a known variable distance from an intersection of said xy-plane and a yz-plane.

3. The system of claim 1 further comprising a third dual bridge sensor coupled to said platform at an angle such that said third dual bridge sensor is sensitive to movement of said third dual bridge sensor in a yz-plane, said third dual bridge sensor comprising a third flexure plate generating a third dual bridge sensor signal in response to movement of said third flexure plate, wherein said processor drives said third dual bridge sensor with said precision sine wave.

4. The system of claim 3 further comprising a fourth dual bridge sensor coupled to said platform at an angle such that said fourth dual bridge sensor is sensitive to movement of said fourth dual bridge sensor in said yz-plane, said fourth dual bridge sensor comprising a fourth flexure plate generating a fourth dual bridge sensor signal in response to movement of said fourth flexure plate, wherein said processor drives said fourth dual bridge sensor with said precision sine wave.

5. The system of claim 4, wherein said third dual bridge sensor and said fourth dual bridge sensor are equidistant from or a known variable distance from an intersection of an x-axis, a y-axis and a z-axis.

6. The system of claim 4, wherein said processor receives said first dual bridge sensor signal, said second dual bridge sensor signal, said third dual bridge sensor signal and said fourth dual bridge sensor signal and generates said platform control signal in response thereto.

7. The system of claim 6 further comprising a co-adder co-adding said first dual bridge sensor signal.

8. The system of claim 1 further comprising a filter reducing noise in said first dual bridge sensor signal in a time domain.

9. The system of claim 8, wherein said filter comprises a multi-pole filter.

10. A method for operating a leveling system comprising:
    driving a first flexure plate dual bridge sensor with a first precision sine wave;
    generating a first dual bridge sensor signal from said first flexure plate dual bridge sensor;
    driving a second flexure plate dual bridge sensor with a second precision sine wave;
    generating a second dual bridge sensor signal from said second flexure plate dual bridge sensor;
    rotating a platform clockwise when said first dual bridge sensor signal is greater than said second dual bridge sensor signal;
    rotating said platform counter-clockwise when said second dual bridge sensor signal is greater than said first dual bridge sensor signal;
    driving a third flexure plate dual bridge sensor with a third precision sine wave;
    generating a third dual bridge sensor signal from said third flexure plate dual bridge sensor,
    driving a fourth flexure plate dual bride sensor with a fourth precision sine wave;
    generating a fourth dual bridge sensor signal from said fourth flexure plate dual bridge sensor,
    rotating said platform clockwise when said third dual bridge sensor signal is greater than said fourth dual bridge sensor signal; and
    rotating said platform counterclockwise when said fourth dual bridge sensor signal is greater than said third dual bridge sensor signal.

11. The method of claim 10 further comprising calibrating the leveling system in relation to the earth by rotating the system about an x-axis or a z-axis.

12. The method of claim 10 further comprising calibrating the leveling system in relation to a rotation of the earth by rotating the system about a y-axis;
    measuring effects of said rotation; and
    calibrating said effects out of future leveling calculations.

13. The method of claim 10 further comprising generating a level acquired indicator signal, and locking said level acquired indicator signal as a reference plane.

14. A leveling system for a missile system comprising:
    an inertial measurement unit;
    a platform coupled to said inertial measurement unit and defining an xz-plane;
    a first flexure plate dual bridge sensor coupled to said platform at an angle such that said first flexure plate dual bridge sensor is sensitive to movement of said first flexure plate dual bridge sensor in an xy-plane, said first flexure plate dual bridge sensor driven by a precision sine wave, said first flexure plate dual bridge sensor comprising a first flexure plate generating a first accelerometer sine wave signal in response to movement of said first flexure plate;
    a first set of synchronized sigma delta converters converting peaks of said first accelerometer sine wave signal from analog-to-digital and generating a first digital word signal therefrom;
    a second flexure plate dual bridge sensor coupled to said platform at an angle such that said second flexure plate dual bridge sensor is sensitive to movement of said second flexure plate dual bridge sensor in said xy-plane, said second flexure plate dual bridge sensor driven by said precision sine wave, said second flexure plate dual bridge sensor comprising a second flexure plate generating a second accelerometer sine wave signal in response to movement of said second flexure plate;

a second set of synchronized sigma delta converters converting peaks of said second accelerometer sine wave signal from analog-to-digital and generating a second digital word signal therefrom;

a third flexure plate, dual bridge sensor coupled to said platform at an angle such that said third flexure plate dual bridge sensor is sensitive to movement of said third dual bridge sensor in a yz-plane, said third flexure plate dual bridge sensor driven by said precision sine wave, said third flexure plate dual bridge sensor comprising a third flexure plate generating a third accelerometer sine wave signal in response to movement of said third flexure plate;

a third set of synchronized sigma delta converters converting peaks of said third accelerometer sine wave signal from analog-to-digital and generating a third digital word signal from;

a fourth flexure plate dual bridge sensor coupled to said platform at an angle such that said fourth flexure plate dual bridge sensor is sensitive to movement of said fourth dual bridge sensor in said yz-plane, said fourth flexure plate dual bridge sensor driven by said precision sine wave said fourth flexure plate dual bridge sensor comprising a fourth flexure plate generating a fourth accelerometer sine wave signal in response to movement of said fourth flexure plate;

a fourth set of synchronized sigma delta converters converting peaks of said fourth accelerometer sine wave signal from analog-to-digital and generating a fourth digital word signal therefrom;

an actuator activating an object control device in response to a platform control signal;

a processor receiving said first digital word signal, said second digital word signal, said third digital word signal and said fourth digital word signal and generating said platform control signal in response thereto, wherein said platform control signal comprises logic rotating said platform clockwise when said first digital word signal is greater than said second digital word signal, rotating said platform counter-clockwise when said second digital word signal is greater than said first digital word signal, rotating said platform clockwise when said third digital word signal is greater than said fourth digital word signal, and rotating said platform counterclockwise when said fourth digital word signal is greater than said third digital word signal.

15. The system of claim 14 wherein said object control device comprises at least one of a thruster, an attitude control device, a missile steering nozzle, or a vane actuator.

16. The system of claim 14, wherein said second and third flexure plate dual bridge sensors are arranged with said first flexure plate dual bridge sensor to receive cross axis thrust data.

17. The system of claim 16 further comprising a filter reducing noise in said first digital word signal in a time domain.

18. The system of claim 14 further comprising a co-adder co-adding said first digital word signal.

19. The system of claim 14 further comprising a phase relation device receiving digital word signals from said set of synchronized sigma delta converters, wherein a phase relation of an accelerometer signal from a first one of said set of synchronized sigma delta converters with respect to a reference signal generated from a second one of said set of synchronized sigma delta converters generates an indication of the acceleration direction, wherein said reference signal rectifies or demodulates peak signal conversions from said set of synchronized sigma delta converters and generates a rectified signal therefrom, and wherein said phase relation device divides said rectified signal by a reference amplitude from said second one of said set of synchronized sigma delta converters.

20. The system of claim 16, wherein said processor calibrates the leveling system in relation to the earth by generating a rotation signal to rotate the leveling system about an x-axis or a z-axis, said processor further generating a signal to rotate the leveling system about a y-axis in response to a rotation of the earth, said processor further measuring effects of said rotation about said x-axis, said y-axis, or said z-axis, said processor still further calibrating said effects out of future leveling calculations.

21. The system of claim 20, wherein said processor further generates a level acquired indicator signal in response to said first flexure plate dual bridge sensor, said second flexure plate dual bridge sensor, said third flexure plate dual bridge sensor, and said fourth flexure plate dual bridge sensor all equal, said processor further locking said level acquired indicator signal as a reference plane.

* * * * *